(12) United States Patent
Plants et al.

(10) Patent No.: US 7,941,685 B2
(45) Date of Patent: *May 10, 2011

(54) DELAY LOCKED LOOP FOR AN FPGA ARCHITECTURE

(75) Inventors: William C. Plants, Campbell, CA (US); Nikhil Mazumder, San Jose, CA (US); Arunangshu Kundu, San Jose, CA (US); James Joseph, Monument, CO (US); Wayne W. Wong, Sunnyvale, CA (US)

(73) Assignee: Actel Corporation, Mountain View, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 12/337,201

(22) Filed: Dec. 17, 2008

(65) Prior Publication Data
US 2009/0094475 A1    Apr. 9, 2009

Related U.S. Application Data

(63) Continuation of application No. 11/561,695, filed on Nov. 20, 2006, now Pat. No. 7,484,113, which is a continuation of application No. 11/189,199, filed on Jul. 25, 2005, now Pat. No. 7,171,575, which is a continuation of application No. 10/722,636, filed on Nov. 25, 2003, now Pat. No. 6,976,185, which is a continuation of application No. 09/519,311, filed on Mar. 6, 2000, now Pat. No. 6,718,477.

(51) Int. Cl.
*G06F 1/08* (2006.01)
(52) U.S. Cl. ........................................ 713/500; 327/105
(58) Field of Classification Search .................. 713/401, 713/500
See application file for complete search history.

(56) References Cited

U.S. PATENT DOCUMENTS

| 5,666,322 | A | 9/1997 | Conkle |
| 5,771,264 | A | 6/1998 | Lane |
| 5,994,934 | A | 11/1999 | Yoshimura et al. |
| 6,043,677 | A | 3/2000 | Albu et al. |
| 6,111,448 | A | 8/2000 | Shibayama |
| 6,181,174 | B1 | 1/2001 | Fujieda et al. |
| 6,289,068 | B1 | 9/2001 | Hassoun et al. |

(Continued)

FOREIGN PATENT DOCUMENTS

EP    1 137 188 A2    9/2001

(Continued)

OTHER PUBLICATIONS

L. Ashby, "ASIC Clock Distribution using a Phase Locked Loop (PLL)," *Proceedings Fourth Annual IEEE International ASIC Conference and Exhibit*, pp. 6.1-6.3, Sep. 1991.

(Continued)

*Primary Examiner* — Thomas Lee
*Assistant Examiner* — Eric Chang
(74) *Attorney, Agent, or Firm* — Lewis and Roca LLP

(57) ABSTRACT

A DLL provides a deskew mode for aligning a reference clock that passes through a clock distribution tree to a feedback by adding additional delay to the feedback clock to align the feedback clock with reference clock at one cycle later. A 0 ns clock-to-out mode is provided by adding additional delay to account for an input buffer into a feedback path. The feedback clock can be doubled by a clock doubler with 50% duty cycle adjustment disposed in the feedback path. Flexible timing is aligning the reference clock to the feedback clock is obtained with additional delay elements disposed in the feedback and reference clock paths.

10 Claims, 17 Drawing Sheets

U.S. PATENT DOCUMENTS

| | | |
|---|---|---|
| 6,292,016 B1 | 9/2001 | Jefferson et al. |
| 6,437,650 B1 | 8/2002 | Sung et al. |
| 6,580,301 B2 | 6/2003 | Moshe et al. |
| 6,718,477 B1 | 4/2004 | Plants et al. |
| 6,976,185 B1 | 12/2005 | Plants et al. |
| 7,171,575 B1 | 1/2007 | Plants et al. |
| 7,484,113 B1 | 1/2009 | Plants et al. |

FOREIGN PATENT DOCUMENTS

| | | |
|---|---|---|
| EP | 1 137 188 A3 | 8/2003 |

OTHER PUBLICATIONS

"AV9170 Clock Synchronizer and Multiplier" Integrated Circuit Systems, Inc., pp. 1-11, Sep. 24, 1999.

AV9170 Application Note: "Clock Synchronizer and Multiplier," Integrated Circuit Systems, Inc., pp. 1-7.

Uming Ko et al., "A 30-ps JITTER, 3.6 us Locking, 3.3-Volt Digital PLL for CMOS Gate Arrays," IEEE 1993 Custom Integrated Circuits Conference, pp. 23.3.1-23.3.4, Conf. Date: May 9-12, 1993.

A. Efendovich et al., "Multi-Frequency Zero-Jitter Delay-Locked Loop," IEEE 1993 Custom Integrated Circuits Conference, pp. 27.1.1-27.1.4, Conf Date: May 9-12, 1993.

R. Quinnell, "Blending gate arrays with dedicated circuits sweetens ASIC development," EDN, pp. 29-32, Mar. 31, 1994.

J. Chen, "PLL-based clock systems span the system spectrum from green PCs to Alpha," EDN, pp. 147-155, Nov. 9, 1995.

P. Sevalia, "Straightforward techniques cut jitter in PLL-based clock drivers," EDN, pp. 119-125, Nov. 23, 1995.

D. Bursky, "Memories Hit New Highs and Clocks Run Jitter-Free," Electronic Design, pp. 79-93, Feb. 19, 1996.

DELAY LOCKED LOOP FOR AN FPGA ARCHITECTURE

CROSS-REFERENCE TO RELATED APPLICATIONS

This application is a continuation of co-pending U.S. patent application Ser. No. 11/561,695, filed Nov. 20, 2006, which is a continuation of U.S. patent application Ser. No. 11/189,199, filed Jul. 25, 2005, now issued as U.S. Pat. No. 7,171,575, which is a continuation of U.S. patent application Ser. No. 10/722,636, filed Nov. 25, 2003, now U.S. Pat. No. 6,976,185, which is a continuation of U.S. patent application Ser. No. 09/519,311, filed Mar. 6, 2000, now U.S. Pat. No. 6,718,477, which are hereby incorporated by reference as if set forth herein.

BACKGROUND OF THE INVENTION

1. Field of the Invention

The present invention relates to a delay locked loop (DLL). More particularly, the present invention relates to a DLL in a field programmable gate array (FPGA).

2. Background Art

With the advent of FPGA architectures having greater complexity, it is well understood by those of ordinary skill in the art that extensive digital systems can be implemented in FPGA devices. These FPGA devices may include many dockable elements such as D-Type flip flops and blocks of user assignable static random access memory (SRAM). The D-type flip flops and the user assignable SRAM in the FPGA device may either be synchronized to the same clock or to several different clocks. When a substantial number of these dockable elements are employed in a particular design, it is presently contemplated that at least one multi-level "clock tree" will be provided in the FPGA device.

Multi-level clock trees are circuit devices that are well known to those of ordinary skill in the art. Typically, in a multi-level clock tree, a single lock source will drive the inputs to several clock buffers in the clock tree. This is known in the art as fanout. When the fanout becomes too large the clock signal will become unacceptably degraded. Accordingly, the fanout that a single source is permitted to drive is limited. The amount of fanout permitted depends upon the design being implemented. By implementing large clock buffers, limitations on the size of the fanout can be ameliorated. However, problems other than clock degradation also occur with the use of clock trees.

When the devices being clocked from the clock buffers are located at varying distances from the clock buffer, the clock signal may become skewed due to the differing clock net lengths. One solution to this problem is to provide a systematic clock tree design by strictly controlling the clock net lengths. Another is to incorporate final stage clock buffers that are located physically close to the clock inputs being driven. It should be appreciated however, that when additional systematic clock tree levels are introduced, additional delay is inserted between an original clock source and the clock input lines leading to the dockable elements in the FPGA.

This delay shows up, from the FPGA users viewpoint, as a lengthening of the FPGA's "clock-to-out" delay and an increase in the "hold time" of the FPGA. If the clock-to-out delay becomes too great a portion of the clock period, the overall system performance may suffer because the clock period would have to be lengthened to compensate for the length of the clock-to-out delay. It should be readily appreciated that other timing problems may occur in a design implemented in the FPGA as a result.

It is therefore an object of the present invention to control the internal clock tree delay by setting the internal clock tree delay to an amount that is selected by a user.

It yet another object of the present invention to implement a delay lock loop (DLL) having a plurality of modes for output feedback of the clock distribution tree.

It is another object of the present invention to provide a flexible interface between a DLL and the clock distribution trees, clock pads and signals from within an FPGA.

It is yet another object of the present invention to provide reset and power down signals for a DLL and a DLL/locked signal from the DLL.

These and other objects and advantages of the present invention will be readily appreciated by those of ordinary skill in the art from the disclosure of the embodiments of the present invention made herein.

BRIEF DESCRIPTION OF THE INVENTION

According to the present invention, a delay locked loop (DLL) is employed in a field programmable gate array (FPGA) to align the active edge of a reference clock with a selected edge of a delayed clock, hereinafter referred to as the feedback clock. The reference clock may either be an internal or external clock signal, and the feedback clock is a clock signal that is derived from the reference clock signal, but has been delayed by some circuit in the FPGA, for example, a clock distribution tree. In the operation of the DLL, the feedback clock is farther delayed until the selected edge of the feedback clock is aligned with, but trailing by one cycle, the active edge of the reference clock. According to various aspects of the present invention, the feedback path of the feedback clock may be programmably selected to align the feedback clock to the reference clock at selected circuit nodes in the FPGA for the purpose of either deskewing the feedback clock or providing a 0 ns clock-to-out for the reference clock.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
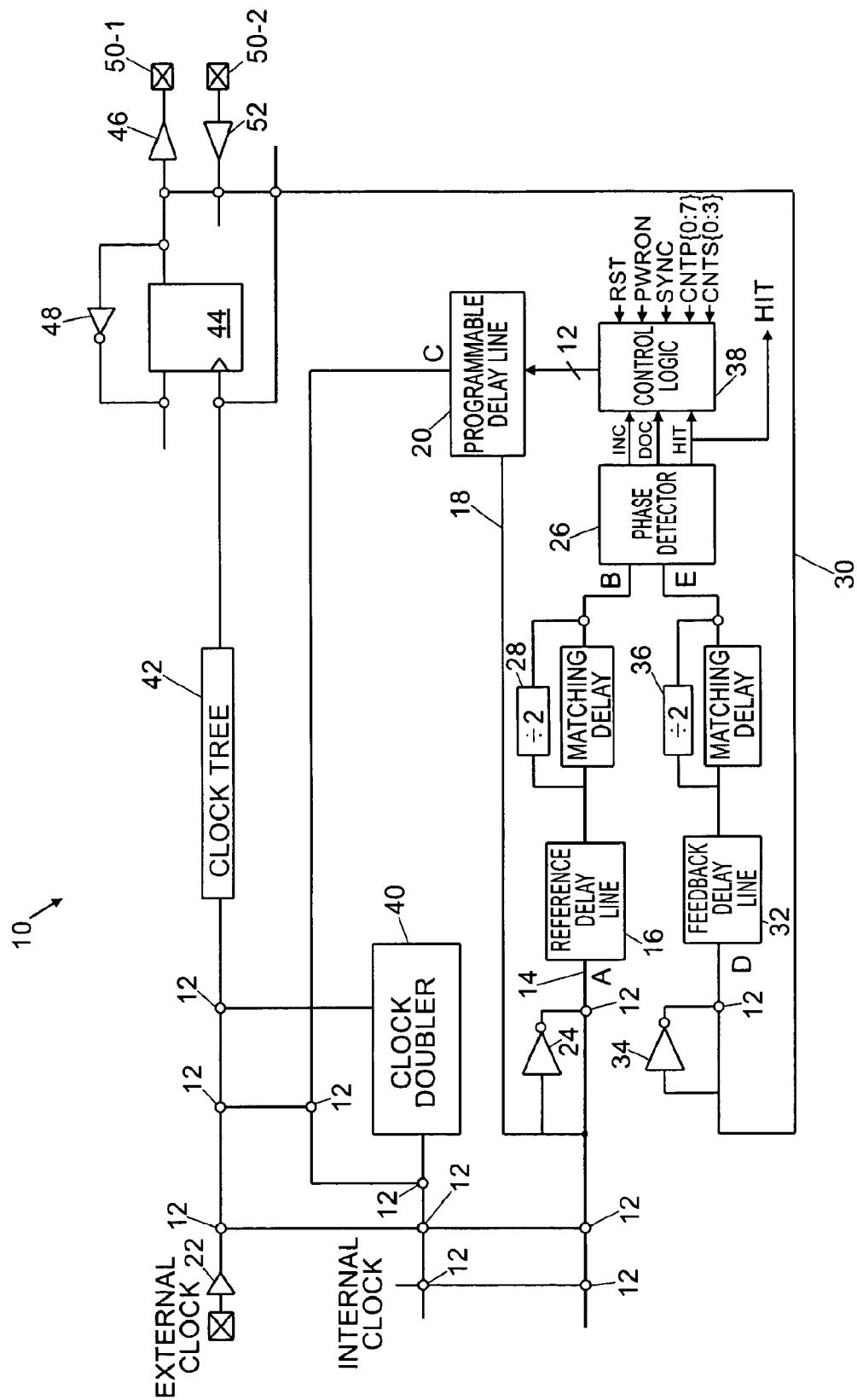
FIG. 1 is a block diagram of a DLL and other circuit elements depicting various programmable connections according to the present invention.

In FIG. 1, a diagram of a DLL 10 and some additional circuit elements according to the present invention are illustrated. Various portions of the diagram in FIG. 1 may be connected by programmable interconnect elements 12 that are illustrated as open circles. It will be appreciated by those of ordinary skill in the art that programmable interconnect elements 12 suitable for use according to the present invention may be any of several one time programmable or reprogrammable elements, including antifuses, EEPROM bits, SRAM bits or transistors.

In FIG. 1, a reference clock signal is supplied by either an INTERNAL CLOCK signal or EXTERNAL CLOCK signal that is programmably coupled by a programmable interconnect element 12 to the input 14 of a reference delay line 16, and the input 18 of a programmable delay line 20 in the DLL 10. When the EXTERNAL CLOCK is employed as the reference clock, the EXTERNAL CLOCK passes through an input buffer 22 having an associated delay. The sense of the reference clock may be inverted by an inverter 24 that is programmably disposed 1:1 in series with the input 14 to the reference delay line 16. The output of the reference delay line 16 is coupled to a first input of a phase detector 26. The frequency of the reference may be halved by a divide-by-two circuit 28 that may be programmably disposed in series between the reference delay line 16 and the first input to the phase detector 26.

In DLL 10, a feedback clock signal on conductor 30 is coupled to the input of a feedback delay line 32. The phase of the feedback clock signal may be inverted by an inverter 34 that is programmably disposed in series with the input to the feedback delay line 32. The output of the feedback delay line 32 is coupled to a second input of phase detector 26. The frequency of the feedback clock signal passed through the feedback delay line 32 may be halved by a divide-by-two circuit 36 that is programmably disposed in series between the output of the feedback delay line 32 and the second input to the phase detector 26.

Implementations of divide-by-two circuits 28 and 36 suitable for use according to the present invention are well understood by those of ordinary skill in the art, and therefore will not be disclosed herein to avoid overcomplicating the disclosure and thereby obscuring the present invention. As will be appreciated by those of ordinary skill in the art, to balance the reference and feedback clock signals when either of the divide-by-two circuits 28 or 36 is employed, there is also disposed between the reference delay line 16 and the first input to the phase detector 26 a matching delay to the divide-by-two circuit 36, and between the reference delay line 32 and the second input to the phase detector 26, a matching delay to the divide-by-two circuit 28. The reference delay line 16, the programmable delay line 20, and the feedback delay line 32 will be described in greater detail below.

In the DLL 10, operations are performed in two separate modes. In the first mode, termed acquisition, the phase of the feedback clock signal is aligned with the phase of the reference clock signal. In the second mode, termed maintenance, the alignment of the feedback clock signal to the reference clock signal is maintained. In these operations, the phase detector 26 compares the difference in phase between the reference clock signal and the feedback clock signal and in response provides increment, decrement, or phase lock signals, illustrated respectively as INC, DEC and HIT to control logic 38. The INC, DEC and HIT signals from the phase detector 26 are used by control logic 38 to provide data to the programmable delay line 20 that determines the amount of delay in the programmable delay line 20. The operation of the reference delay line 16, the feedback delay line 32, the phase detector 26, control logic 38, and programmable delay line 20 to acquire or maintain the alignment of the feedback clock signal to the reference clock signal will be described in greater detail below. The HIT signal is also otherwise provided to generate a DLL locked signal.

The implementation of the phase detector 26 and control logic 38 are well within the level of skill of those of ordinary skill in the art, and therefore will not be disclosed herein to avoid overcomplicating the disclosure and thereby obscuring the present invention.

The control logic 38 is also coupled to other signals that are either external or internal to the FPGA. The signals are reset, power on-reset, synchronization, control primary, and control secondary illustrated respectively as RST, PWRON, SYNC, CNTP<0:7>, and CNTS<0:3>. These signals implement added functionality to the DLL 10. The RST signal resets the entire DLL 10 prior to acquiring a locked condition. The PWRON signal shuts down the DLL 10 to conserve power during non-use when the FPGA is employed to power critical implementations, such as battery powered applications. Otherwise there would be DC power provided to the phase detector 26. The SYNC signal enables operation of the DLL 10. The CNTP<0:7>, and CNTS<0:3> set primary and secondary delay lines in the programmable delay line 22 to a selected value upon reset of the DLL 10.

The output of the programmable delay line 20 may be programmably connected to either the input of a clock doubler 40 or the input of a clock tree 42. The input of the clock doubler 40 may otherwise be programmably connected to either the EXTERNAL or the INTERNAL clock. Accordingly, it should be appreciated that although the clock doubler 40 may be employed by the DLL 10, the clock doubler 40 may be used independently by the FPGA as well. An implementation of the clock doubler 40 suitable for use according to the present invention will be described below.

The output of the clock tree 42 is coupled to the clock input of a flip-flop 44 or may otherwise be programmably connected to conductor 30. The output of flip-flop 44 is coupled to the input of an output buffer 46 or may otherwise be coupled to feedback conductor 30. The output of flip-flop 44 may also be programmably connected to the input of flip-flop 44 through inverter 48 to double the frequency of the output of flip-flop 44. It should be appreciated, and will be shown in greater detail below, that the flip-flop 44 represents data flip-flops in the FPGA that drive output buffers as well as other sequential logic elements in the FPGA.

In a first embodiment, the output of output buffer 46 is coupled to an external pad 50-1, and the input of an input buffer 52 is coupled to an external pad 50-2. The output of input buffer 52 may be programmably connected to feedback conductor 30. In a second embodiment, the output and input buffers 46 and 52 are implemented as a bilateral buffer coupled to a single external pad 50. When separate pads 50-1 and 50-2 are employed, the external delay affecting the delay of the input buffer 22 can be better matched by input buffer 52 to help provide the 0 ns clock-to-out for the reference clock.

According to the present invention, as described above, the DLL 10 can either be used to deskew a feedback clock so that it matches a reference clock or can be used to provide a 0 ns clock-to-out for the reference clock. When the DLL 10 is employed for clock deskew, the feedback clock path is picked off at the input to the flip-flop 44, and when the DLL is employed for 0 ns clock-to-out the feedback clock path is picked off at the output of the input buffer 52. Various modes which implement these uses of the DLL 10 for the clock doubler 40 and both the INTERNAL and EXTERNAL reference clocks will be described in greater detail below.

Figure 2:
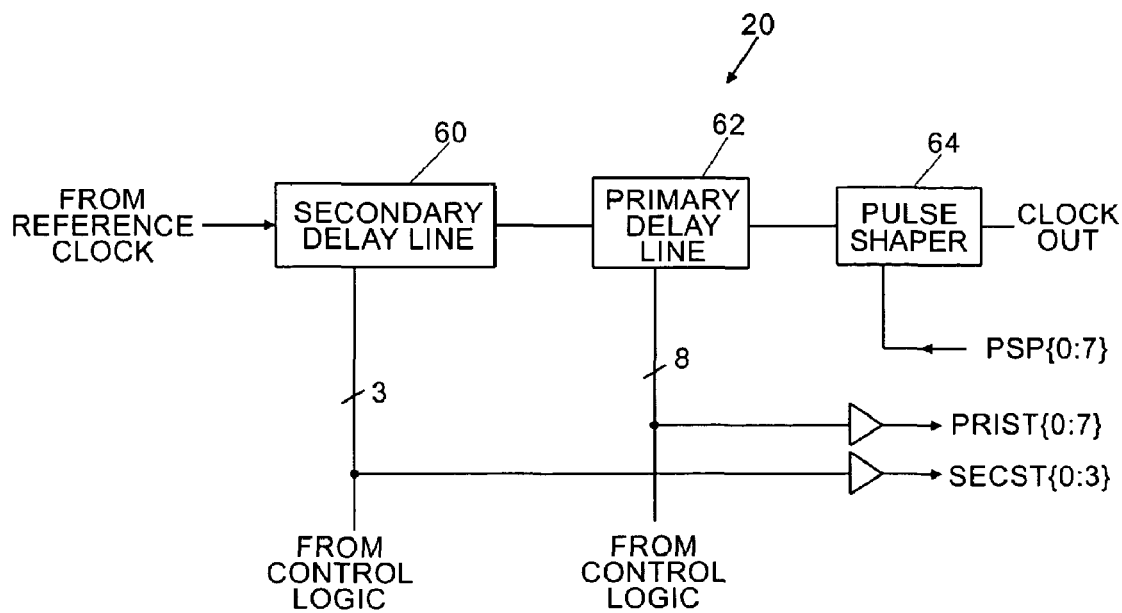
FIG. 2 is a block diagram of a programmable delay line suitable for use according to the present invention.

In FIG. 2, a block diagram of the programmable delay line 20 is illustrated. The programmable delay line 20 includes a secondary delay line 60, a primary delay line 62, and a pulse shaper 64. According to the present invention, the amount of delay provided by the secondary delay line 60 is controlled by four data bits from the control logic 38, and the amount of delay provided by the primary delay line 62 is controlled by eight data bits from the control logic 38. The data bits provided to the secondary delay line 60 by the control logic 38 are provided only during the acquisition mode of aligning the feedback clock signal to the reference clock signal, whereas, the primary delay line 62 is provided data by the control logic 38 during phase acquisition and then during maintenance to actively maintain phase lock during the normal operation of the FPGA after phase acquisition. The values controlling the secondary and primary delay lines 60 and 62, respectively, may be observed external to the FPGA on the SECST<0:3> and PRIST<0:7> status lines. The pulse shaper 64 is employed to compensate for any duty cycle distortion due to variations in the reference clock as a result of processing or temperature variations.

It will be appreciated by those of ordinary skill in the art that there are many ways of implementing the primary and secondary delay lines 62 and 60, respectively, in a manner suitable for use according to the present invention. For example, the primary delay line may be implemented as eight groups, each having eight delay quanta. The eight control signals will then be provided to each of the eight groups. In this manner the primary delay line 62 may be tapped at two hundred and fifty-six locations by the eight control lines to provide the required delay in the primary delay line 62. The secondary delay line 60 can be implemented in a similar manner. Alternatively, the primary and secondary delay lines 62 and 60 may be implemented using a delay quanta to form a binary weighted delay line or a segmented delay line in a manner well understood by those of ordinary skill in the art.

Figure 3:
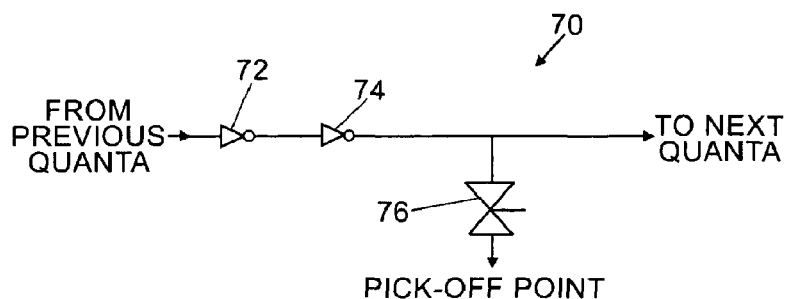
FIG. 3 is a schematic diagram of delay quanta suitable for use according to the present invention.

In FIG. 3, an example of delay quanta 70 suitable for use according to the present invention is illustrated. Other suitable delay quantas are well known to those of ordinary skill in the art. Delay quanta 70 includes first and second inverters 72 and 74, and pass gate 76. The inverters 72 and 74 may be implemented in a number of suitable ways known to those of ordinary skill in the art.

In the delay quanta 70, the inverters 72 and 74 provide delay and the pass gate 76 controls whether the delay quanta 70 is selected as the pick-off point in the programmable delay line 20. The primary delay line 62 provides fine tuning for the programmable delay line 20, and the secondary delay line 60 provides coarse tuning for the delay line 20. In a preferred embodiment, the parameters of the inverters 72 and 74 in the delay quanta 70 are chosen to provide approximately 100 ps of delay for each fine delay quanta in the primary delay line 62 and approximately 2.8 ns of delay for each coarse delay quanta in the secondary delay line 60.

The reference delay line 16 and the feedback delay line 32 are included in the reference clock and feedback clock paths, respectively, to provide flexible timing control that permits the deskewed feedback clock edge to be moved forward or backward in time relative to the external clock. The reference delay line 16 and the feedback delay line 32 have adjustments according to preferred embodiment of approximately 690 ps that is programmable by four data bits. Like the programmable delay line 20, the reference delay line 16 and the feedback delay line 32 may be implemented with delay quanta that are arranged in groups with taps or as binary weighted or segmented delay lines. The inclusion of the reference and feedback delay lines 16 and 32 provides a convenient, responsive, and fine tunable trimming capability for difficult timing issues.

Figure 4A:
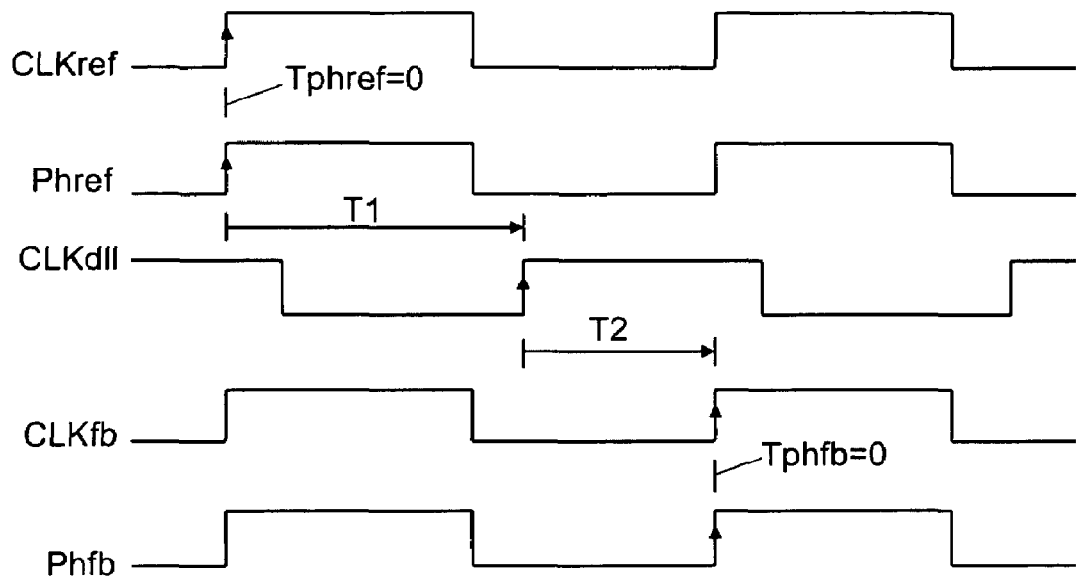
FIGS. 4A-4C illustrate traces of signals for modes of operation of the circuit depicted in FIG. 1 according to the present invention.
Figure 4B:
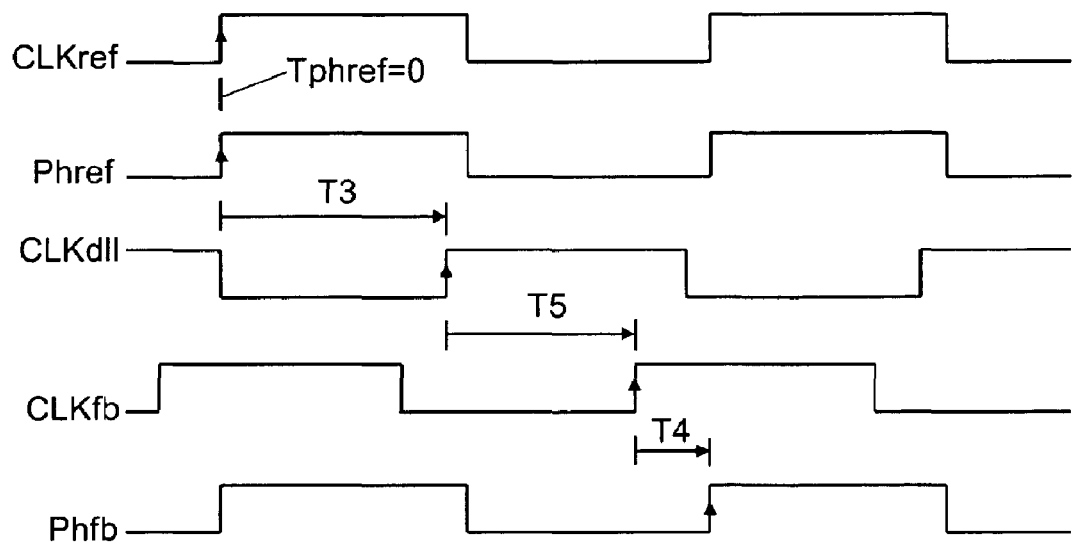
Figure 4C:
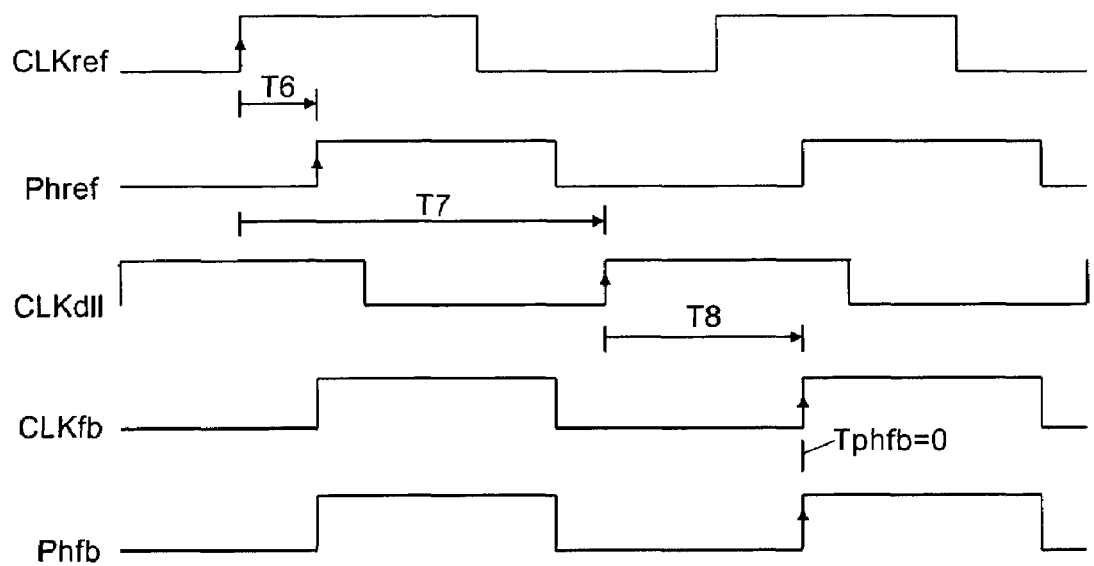

In FIGS. 4A-4C, the flexible timing control is illustrated by the timing diagrams of various signals at different places in the circuit illustrated in FIG. 1. The signals CLKref, PHref, CLKdII, CLKfb, and PHfb are respectively observed at the input to the reference delay line 16 depicted as point A, the first input to the phase detector 26 depicted as point B, the output of the programmable delay line 20 depicted as point C, the input to the feedback delay line 32 depicted as point D, and the second input to the phase detector 26 depicted as point E.

In FIG. 4A, the reference clock is not delayed between points A and B, and neither is the feedback clock between points D and E. Rather the reference clock is delayed by programmable delay 20 an amount, T1, which when added to a delay of amount T2 in the clock tree 42 equals the duration of the duty cycle of the reference clock. In this manner, the selected edge of the feedback clock is aligned with the selected edge of the reference clock at a lag of one duty cycle.

In FIG. 4B, the reference clock is not delayed between points A and B. Rather, the reference clock is delayed by the programmable delay line 20 an amount, T3, and the feedback clock is delayed by the feedback delay line 32 by an amount T4, both of which when added to a delay of amount T5 in the clock tree equals the duration of the duty cycle. In this manner, the selected edge of the feedback clock effectively arrives earlier than the selected edge of the reference clock by the amount T4.

In FIG. 4C, the feedback clock is not delayed between points D and E. Rather, the reference clock is delayed between points A and B in an amount T6 by the reference delay line 16, and also by the programmable delay line 20 an amount which when added to the amount T4 results in a total delay in the amount of T7 produced by the programmable delay line 20. When the amount T7 is added to the delay T8 in the clock tree 42, the selected edge of the feedback clock effectively arrives later than the selected edge of the reference clock by the amount T6.

Figure 5:
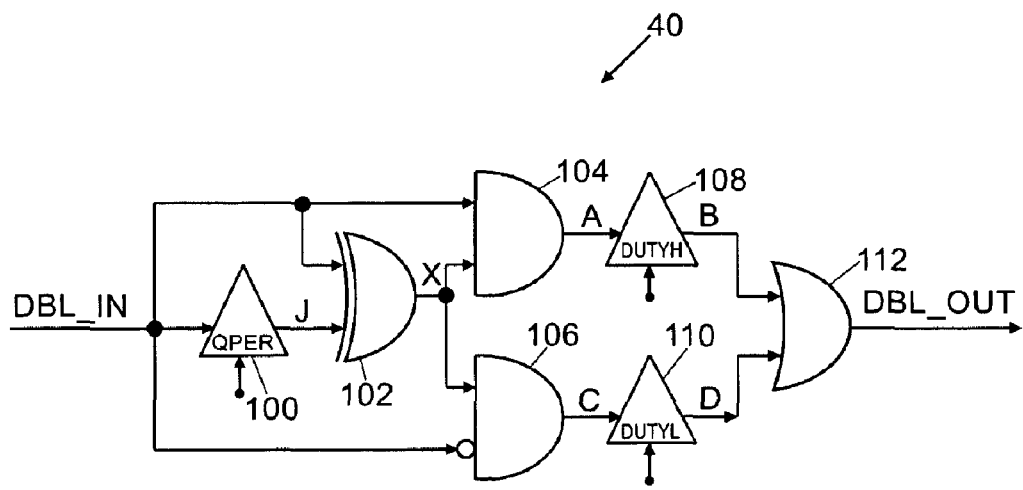
FIG. 5 is a schematic diagram of a clock doubler circuit suitable for use according to the present invention.

Turning now to FIG. 5 a schematic diagram of a preferred embodiment of the clock doubler 40 according to the present invention is illustrated. In clock doubler 40, the reference clock (DBL IN) is fed into a quarter cycle delay line 100, a first input of an XOR gate 102, a first input of an AND gate 104, and through an inverter to a first input of an AND gate 106. The output of the quarter cycle delay line 100 is coupled to a second input of the XOR gate 102, and the output of the XOR gate 102 is coupled to a second input of AND gates 104 and 106. The output of AND gate 104 is coupled to the input of a first duty cycle delay line 108, and the output of AND gate 106 is coupled to the input of a second duty cycle delay line 110. The outputs of first and second duty cycle delay lines 108 and 110 are coupled to first and second inputs of an OR gate 112. The output of OR gate 112 forms the output (DBL OUT) of the clock doubler 40.

Figure 6:
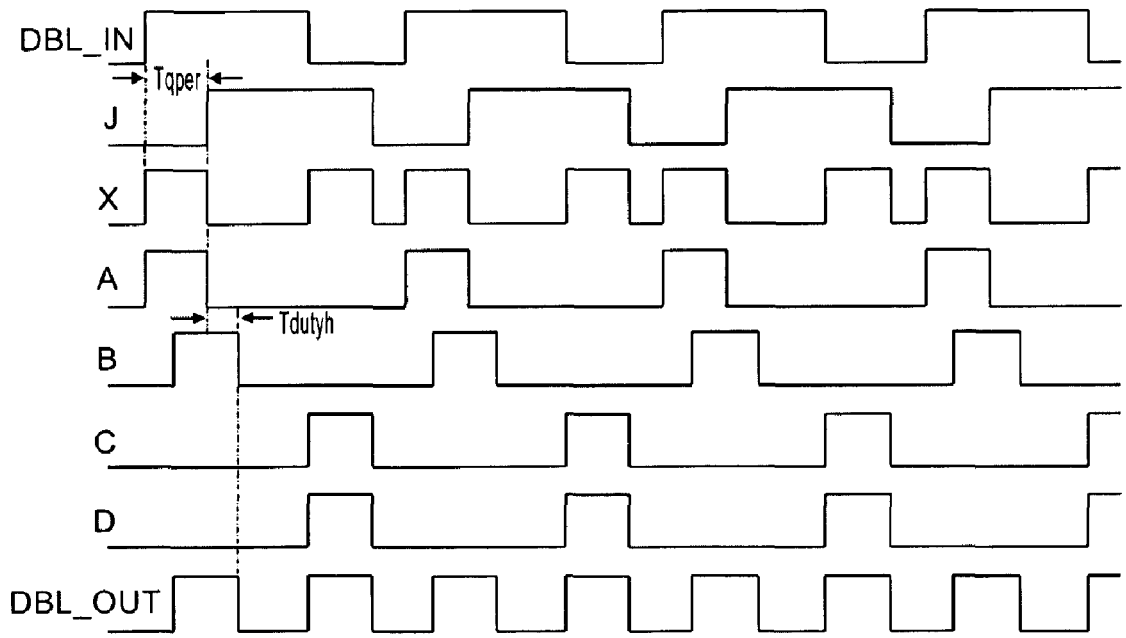
FIG. 6 illustrates traces of signals at various points in the clock doubler circuit depicted in FIG. 5 according to the present invention.

To better understand the operation of the clock doubler 40, in FIG. 6 illustrates traces of signals at various points in the schematic diagram of the clock doubler 40. Turning now to FIG. 6, the output of the quarter cycle delay line 100 is depicted by trace J, the output of the XOR gate 102 is depicted by trace X, the output of AND gate 104 is depicted by trace A, the output of AND gate 106 is depicted by trace C, the output of first duty cycle delay line 108 is depicted by trace B, and the output of second duty cycle delay line 110 is depicted by trace D.

At trace J, it can be observed that the reference clock has been delayed one quarter cycle by the quarter cycle delay line 100 to determine the duty cycle of the clock at DBL OUT. The reference clock is then XORed with the output of the quarter cycle delay line 100 by the XOR gate 102 to provide a doubled clock signal as depicted in trace X. As observed at trace X, if the duty cycle of the reference clock is not precisely 50%, there will be a difference in the resulting clock periods between alternate cycles following the exclusive or operation. To balance this jitter, the duty cycle delay lines 108 can be programmed to add further delays as depicted in traces A and B. In this manner, the traces B and D form the doubled clock output.

The quarter cycle delay line 100, and first and second duty cycle delay lines 108 and 110 may be implemented in a manner similar to the delay lines disclosed above or by other methods well known to those of ordinary skill in the art. In a preferred embodiment, the quarter cycle delay line 100 has sixteen steps of approximately 450 ps per step, and first and second duty cycle delay lines 108 and 110 have sixteen steps of approximately 250 ps per step. It should be appreciated that because the quarter cycle delay line 100, and first and second duty cycle delay lines 108 and 110 are not under active control, the FPGA user must be aware of the input clock frequency and duty cycle, and from these determine the correct settings for the quarter cycle delay line 100, and first and second duty cycle delay lines 108 and 110.

In FIGS. 7A-7L, schematic arrangements of various elements depicted in FIG. 1 that have been coupled by programmable elements, illustrate operating modes and feedback paths of the DLL 10. In each of FIGS. 7A-7L, the reference numerals employed to depict the same blocks and circuit elements depicted in FIGS. 1 and 5 are used. In the discussion of the modes to follow, it should be appreciated that in each of the modes the change of polarity circuits 24 and 34 are available for use.

Figure 7A:
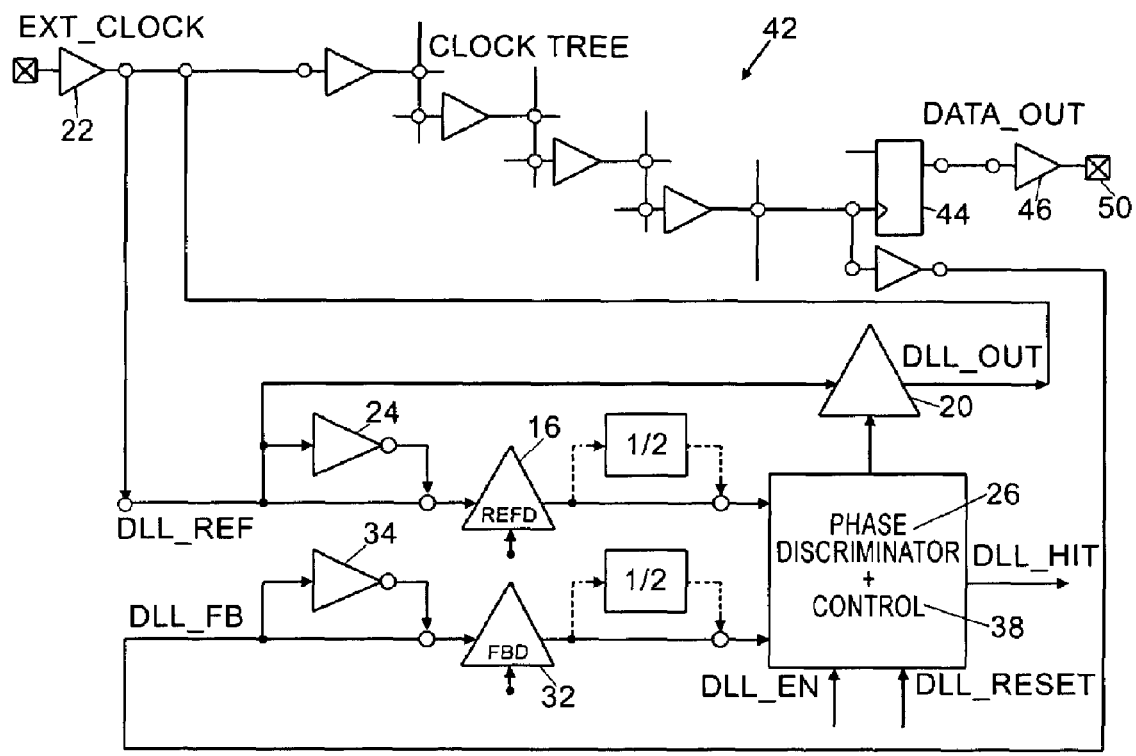
FIGS. 7A-7L illustrate various modes of operation of the circuit depicted in FIG. 1 according to present invention.

FIG. 7A illustrates a mode wherein the delay in the clock distribution tree 42 is zeroed out to reduce the clock-to-out and set-up times in the FPGA. In this mode, the feedback clock signal is picked off at the output of the clock tree 42 and synchronized to the External Clock employed as the reference clock. The synchronized clock output of the clock tree 42 is fed to sequential logic elements in the FPGA, which are represented by flip-flop 44.

To zero out the delay in the clock tree 42, the programmable delay line 20 is set to provide a delay that when added to the delay in the clock tree 42 provides a feedback clock that has a selected edge which matches in phase a selected edge of the reference clock, but is one clock cycle behind the reference clock. Accordingly, any skew in the feedback clock with respect to the reference clock due to the clock tree 42 is eliminated by the DLL 10.

Figure 7B:
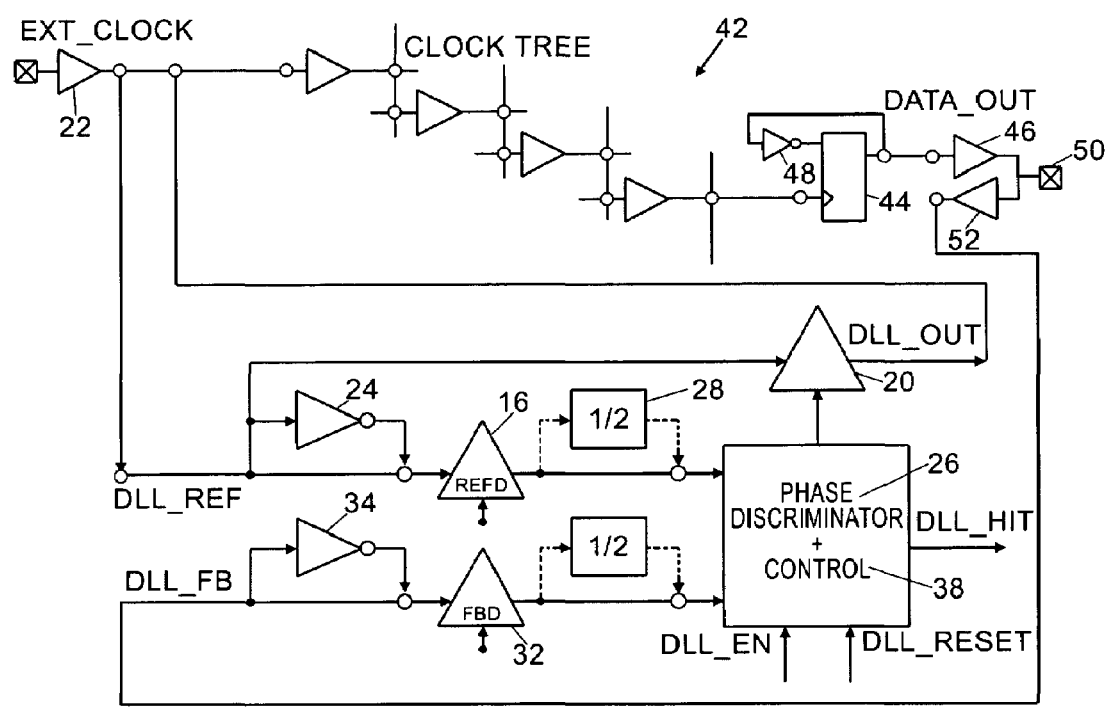

FIG. 7B, illustrates a zero clock-to-out mode. In this mode, the single output pad 50 is synchronized to the External Clock signal. The feedback clock is then is picked off at the output of the clock tree 42 to clock the data flip-flops in the FPGA driving output buffers 46 so that the output buffers 46 will switch at approximately the same time as the External Clock signal to effectively produce a zero clock-to-out. In this mode, the output of the clock tree 42 is divided-by-two by flip-flop 44, passed through output buffer 46 to a single output pad 50, passed back in through input buffer 52 to the input of the feedback delay line 32. By setting the programmable delay line 20 to provide a delay that when added to the delay in the signal as it passes clock tree 42, flip-flop 44, output buffer 46 and input buffer 52 in the bilateral buffer provides a feedback clock that has a selected edge that matches in phase a selected edge of reference clock, but is one clock cycle behind the reference clock. It should be further appreciated that the divide-by-two circuit 28 is employed to divide-by-two the reference clock in the reference clock path to compensate for the use of the flip-flop 44 to divide-by-two the signal in the feedback path.

Figure 7C:
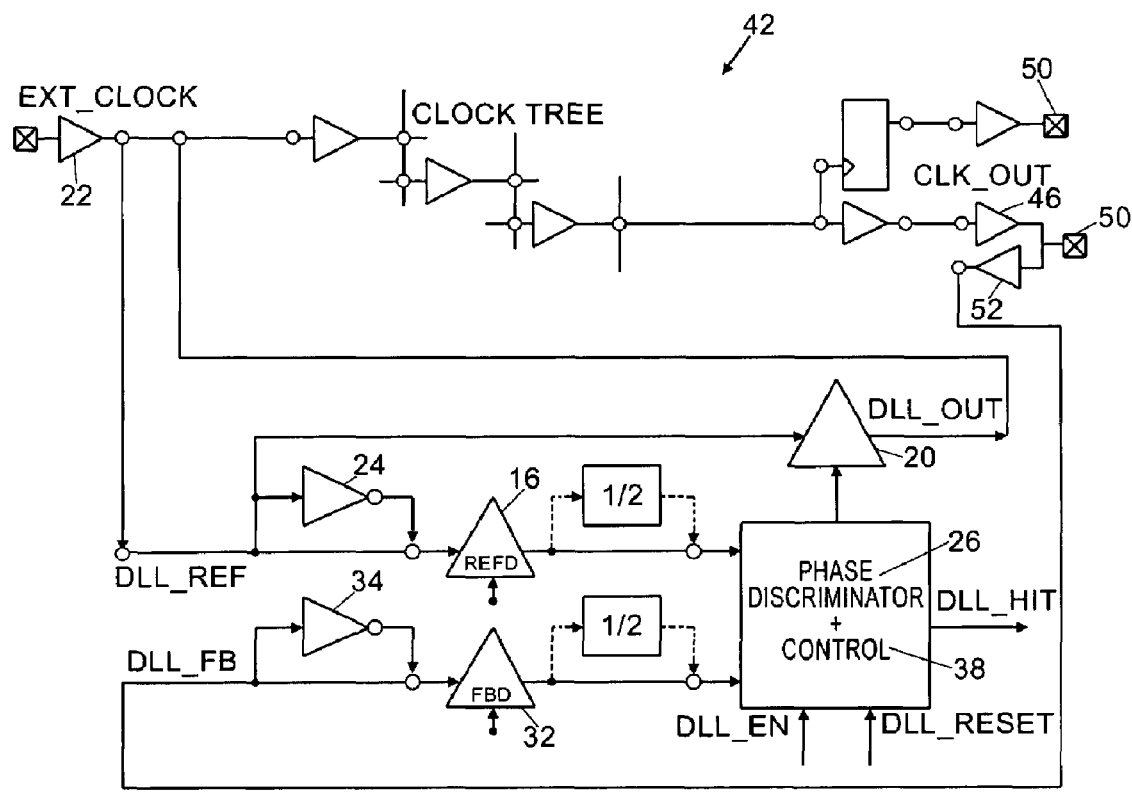

In FIG. 7C, the mode illustrated is similar to that of the mode portrayed in FIG. 7B, except that the clocks are produced at the output pads 50 that have zero delay relative to the external buffered clock, rather than zero clock-to-out.

Figure 7D:
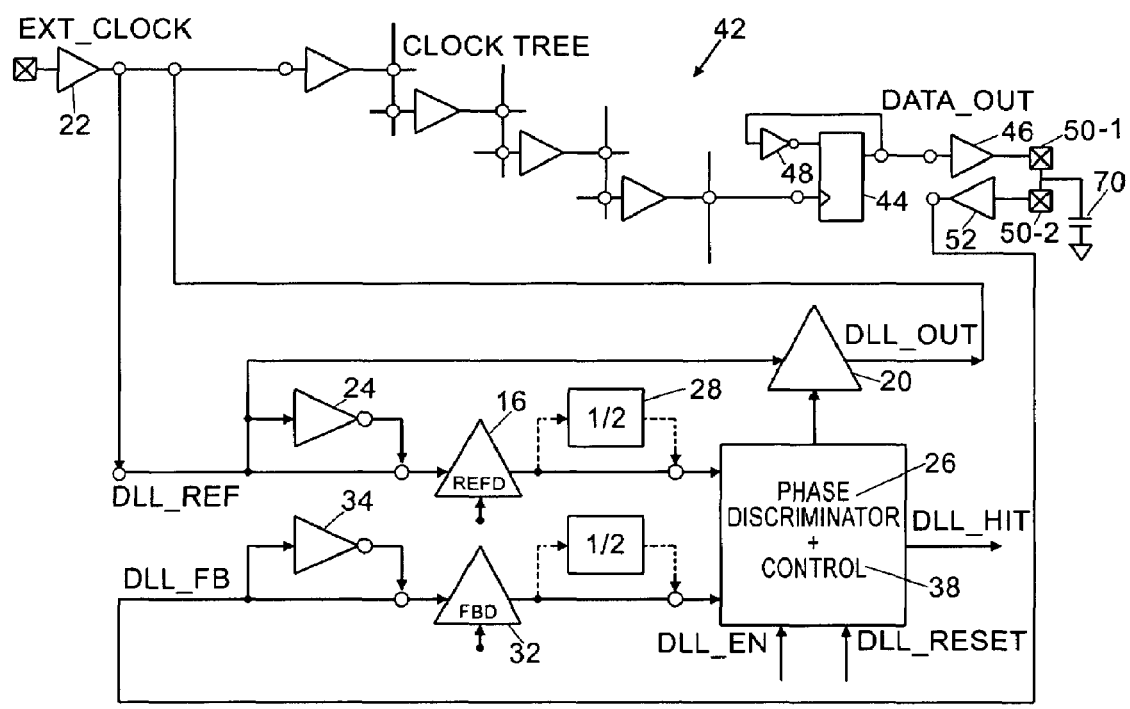

FIG. 7D illustrates the implementation of a mode that is similar to the mode depicted in FIG. 7B, except that separate I/O pads 50-1 and 50-2 are employed instead of the single I/O pad 50, and the output and input buffers 46 and 52 are separate buffers instead of a single bidirectional buffer. In this implementation, a separate load 70 can be connected to the I/O pads 50 so that input buffer 52 is better matched to the input buffer 22 to provide a zero ns clock-to-out between the feedback clock and the reference clock. In this manner, the bondwire or package delays can be zeroed out by including them in the feedback loop, and the printed circuit board trace can be loaded between the two pads to match the slew rate on the input clock trace.

Figure 7E:
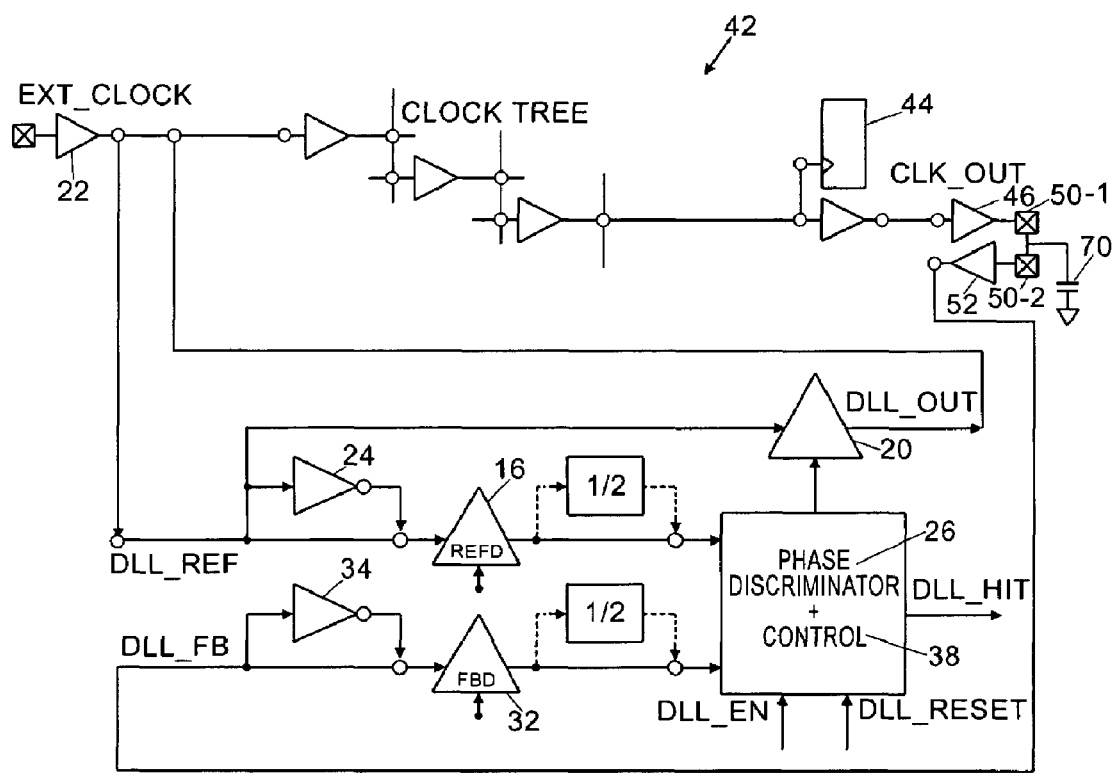

In FIG. 7E, the mode illustrated is similar to that shown in FIG. 7C, however, separate I/O pads 50-1 and 50-2 are employed instead of the single I/O pad 50, and the output and input buffers 46 and 48 are separate buffers instead of a bidirectional buffer. In this implementation, a separate load 70 can be connected to the I/O pads 50 so that input buffer 48 is better matched to the input buffer 22 to provide a zero ns clock-to-out between the feedback clock and the reference clock. In this manner, the bondwire or package delays can be zeroed out by including them in the feedback loop, and the printed circuit board trace can be loaded between the two pads to match the slew rate on the input clock trace.

Figure 7F:
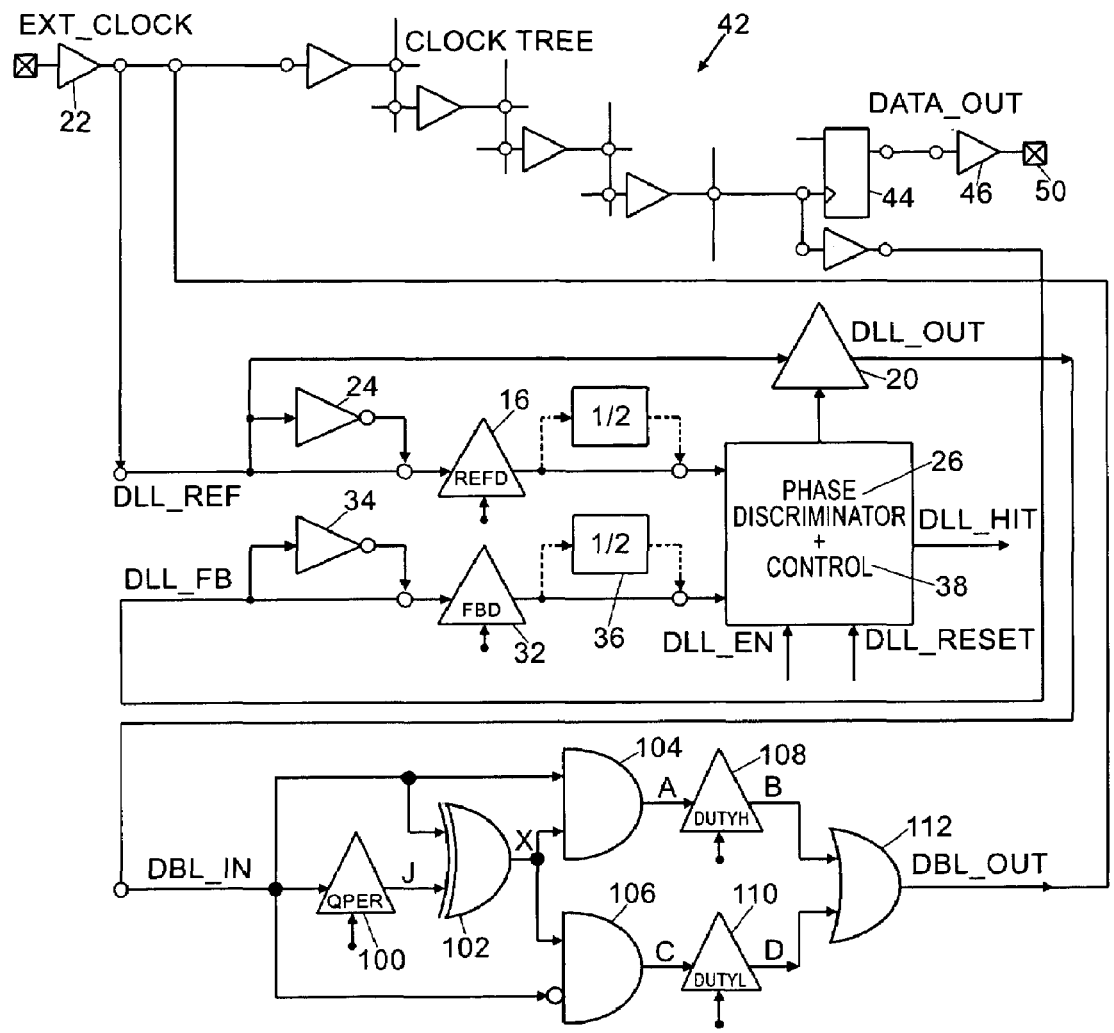

FIG. 7F illustrates a mode that is similar to FIG. 7A, except that the clock doubler 40 is included between the output of the programmable delay line 22 and the input to the clock tree 42 to double the frequency of the reference clock. In this mode, the delay in both the clock doubler and the clock tree are zeroed out because they are included in the feedback loop.

Figure 7G:
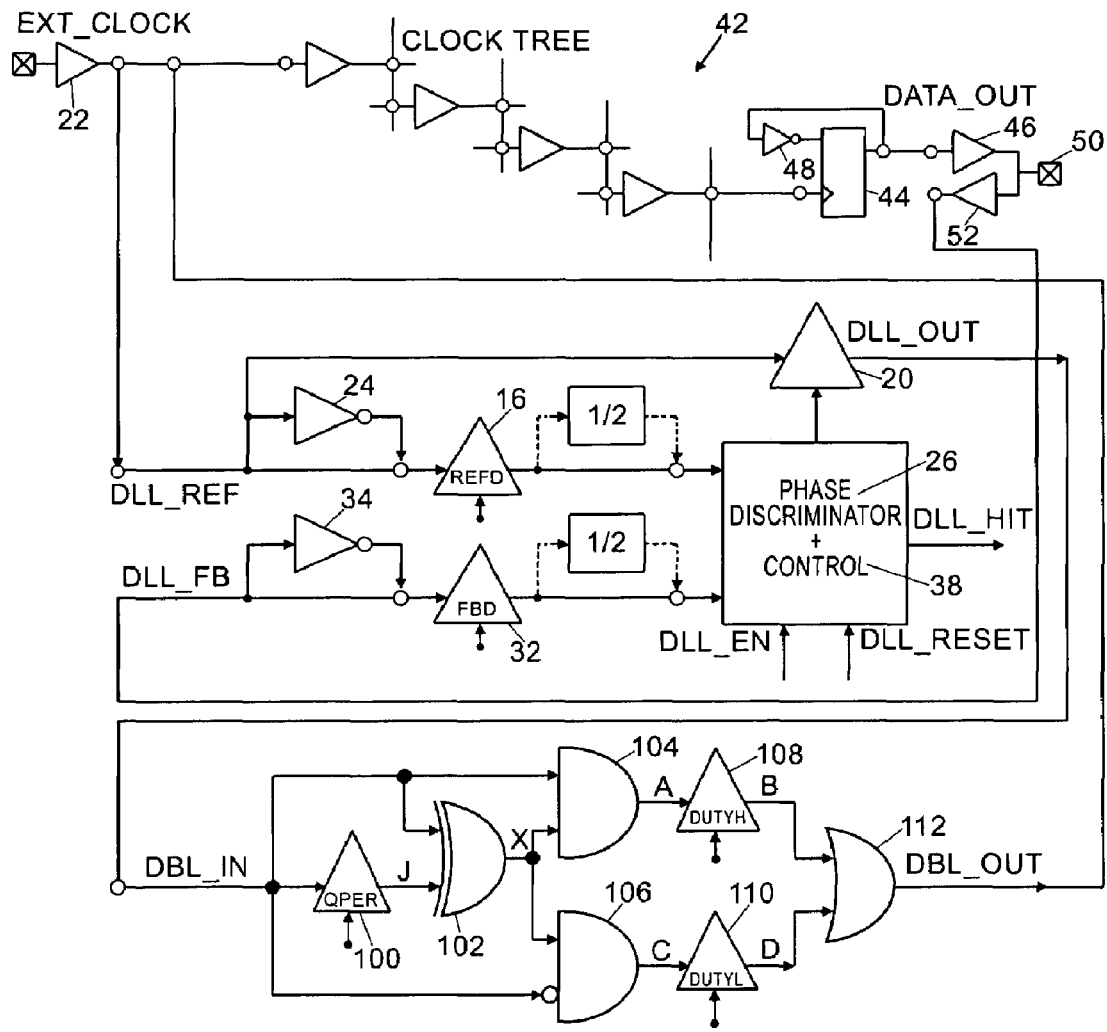

FIG. 7G illustrates a mode that is similar to FIG. 7B, except that the clock doubler 40 is included between the output of the programmable delay line 20 and the input to the clock tree 42 to double the frequency of the reference clock. In this mode, it should be appreciated that the divide-by-two on the feedback input to the phase discriminator is not employed, because the divide-by-two-surrogate for the other array flip-flops carrying data cancels the clock doubler in the feedback path.

Figure 7H:
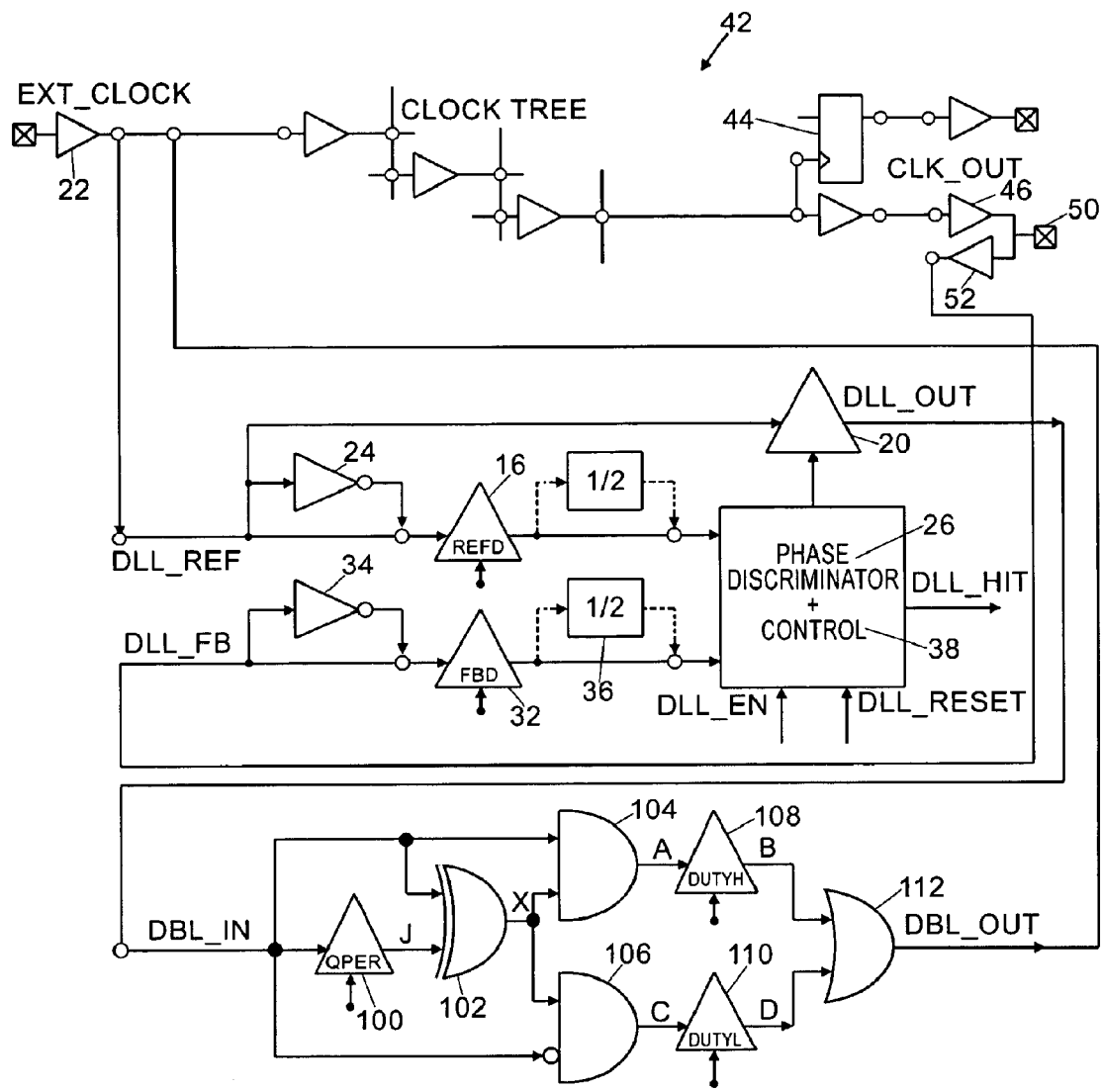

FIG. 7H illustrates a mode that is similar to FIG. 7F, except that like FIG. 7C, the intention is to produce clocks that have zero delay relative to the input clock pad.

Figure 7I:
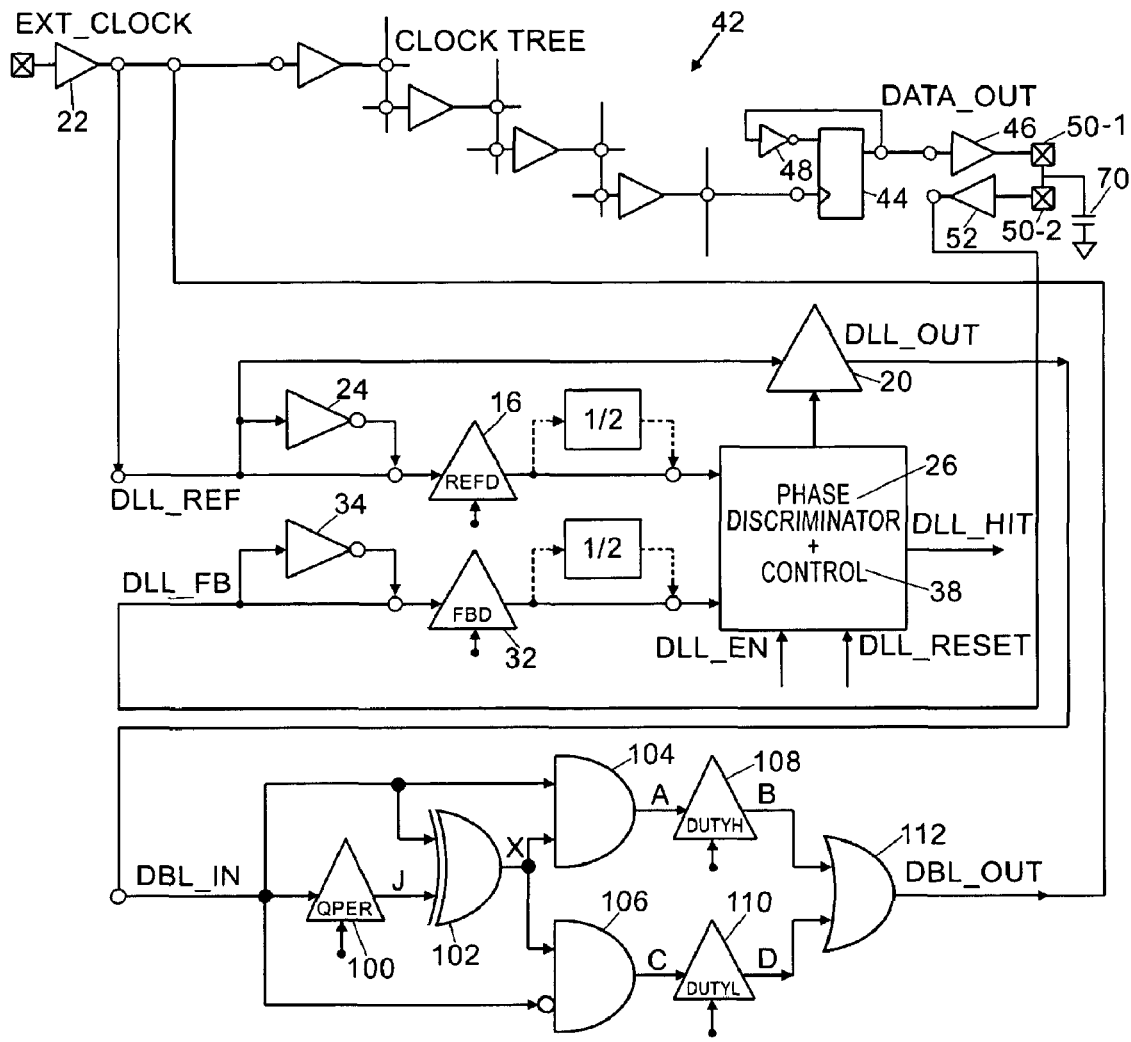

FIG. 7I illustrates a mode that is similar to FIG. 7G, except that like FIG. 7D, two I/O pads are employed to provide the advantages described with respect to FIG. 7D.

Figure 7J:
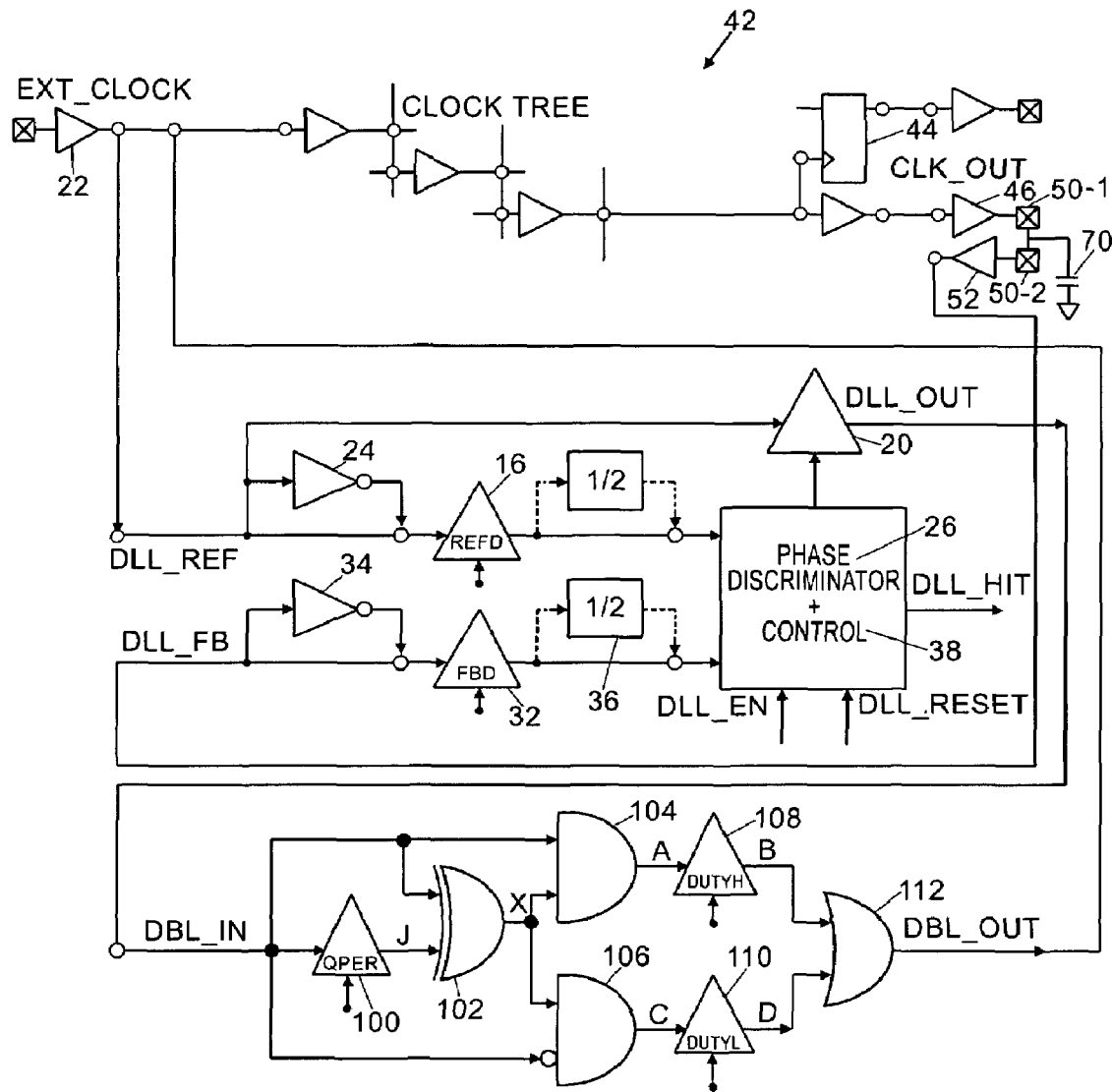

FIG. 7J illustrates a mode that is similar to FIG. 7H, except that like FIG. 7E, two I/O pads are employed to provide the advantages described with respect to FIG. 7E.

Figure 7K:
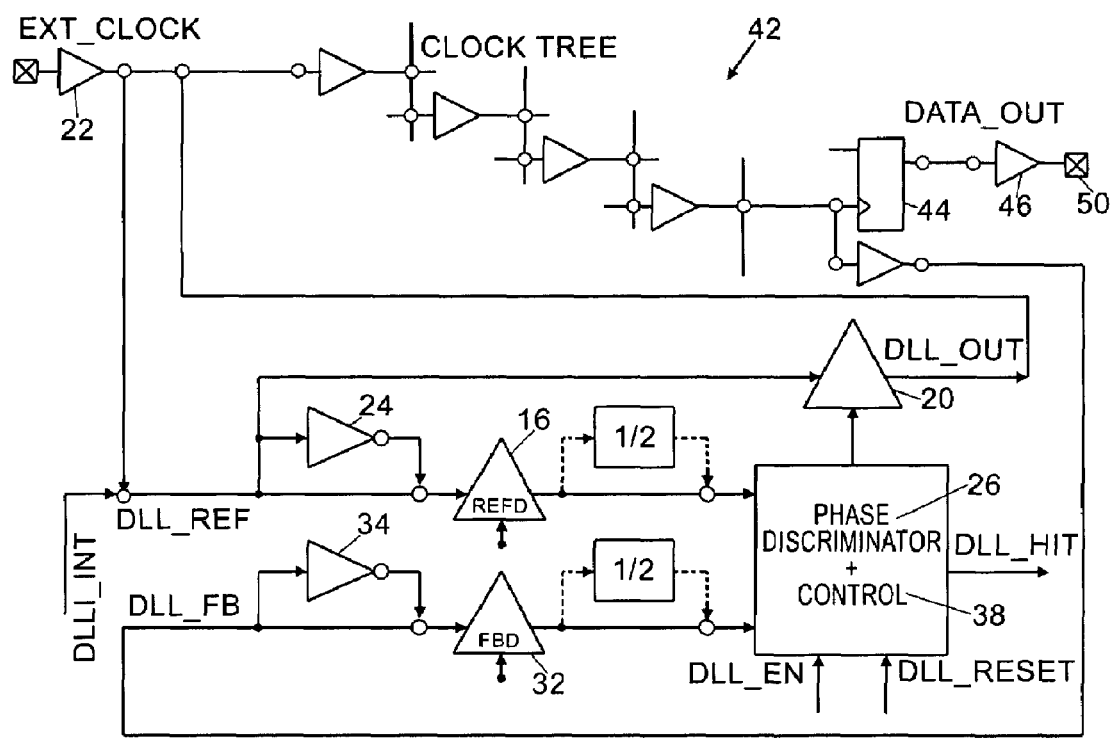

FIG. 7K illustrates a mode that is similar to FIG. 7A, except that an internal clock is employed as the reference clock.

Figure 7L:
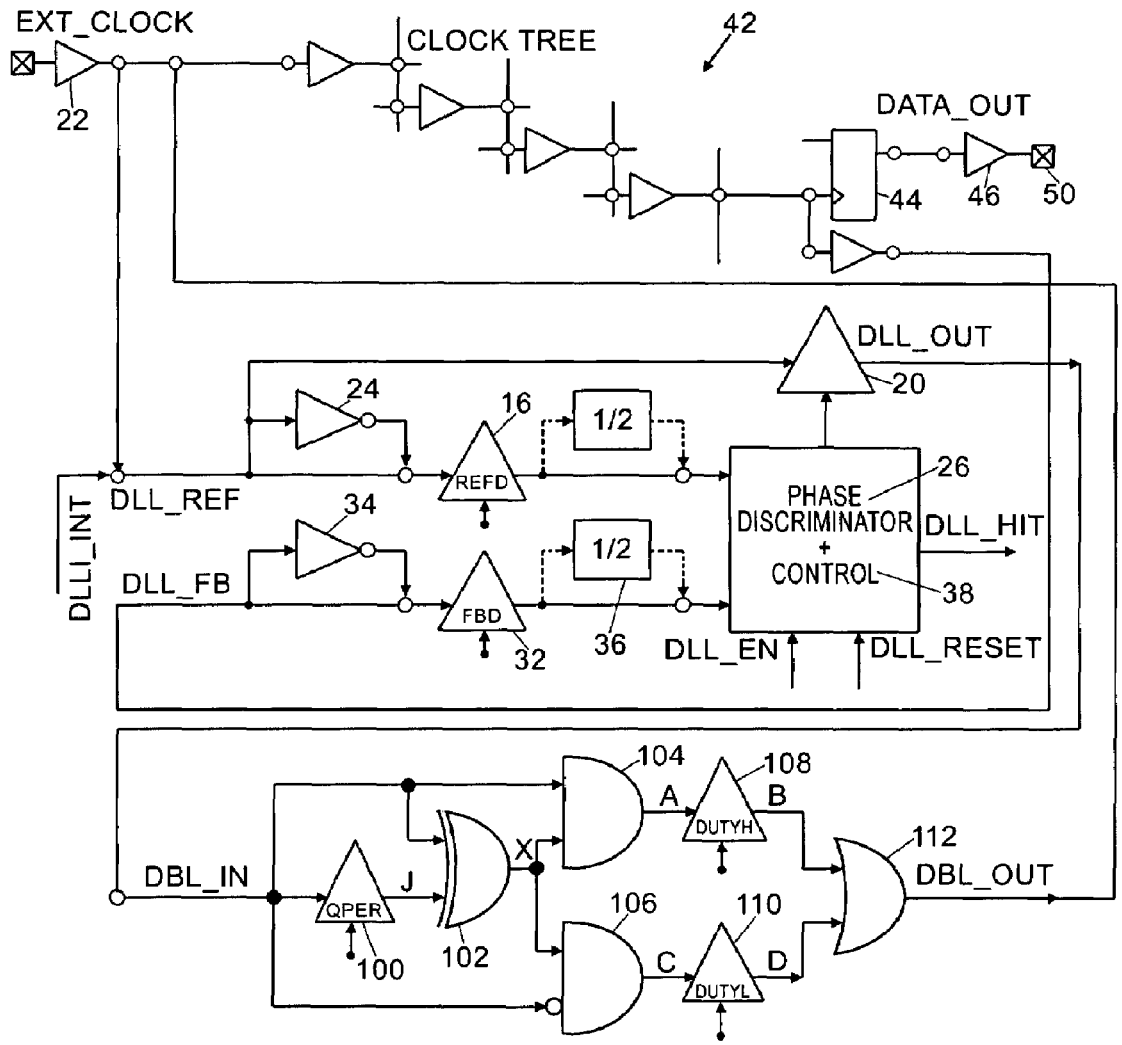

FIG. 7L illustrates a mode that is similar to FIG. 7F, except that an internal clock is employed as the reference clock.

While embodiments and applications of this invention have been shown and described, it would be apparent to those skilled in the art that many more modifications than mentioned above are possible without departing from the inventive concepts herein.

The invention, therefore, is not to be restricted except in the spirit of the appended claims.

What is claimed is:

1. A delay locked loop for an FPGA architecture comprising:
   a reference clock node;
   a reference delay line having a reference clock input coupled to the reference clock node, the reference delay line also having a plurality of delay data inputs and an output,
   a feedback node;
   a feedback delay line having a feedback input coupled to the feedback node, a plurality of delay data inputs, and an output;
   a phase detector having first input, a second input, an increment output, a decrement output, and a hit output, the first input coupled to the output of the reference delay line, the second input coupled to the output of the feedback delay line;
   a control logic circuit having a first input coupled to the increment output of the phase detector, a second input coupled to the decrement output of the phase detector, and a third input coupled to the hit output of the phase detector, the control logic circuit having a plurality of delay data outputs;
   a programmable delay line having a reference clock input programmably coupled to one of the external clock I/O pad and the internal clock node, a plurality of delay data inputs coupled to the plurality of delay outputs of the control logic circuit, and an output;
   a clock tree having an input and an output, the input of the clock tree programmably coupled to the external clock I/O pad, the internal clock node, the out put of the programmable delay line, the output of the clock tree programmably connected to the feedback node;
   a flip-flop having a clock input coupled to the output of the clock tree, a data input, and a data output programmably coupled to the feedback node;
   a first I/O pad programmably coupled to the data output of the flip-flop; and
   a second I/O pad programmably coupled to the clock input of the flip flop and the input to the feedback delay line.

2. The delay locked loop as in claim 1, wherein said programmable delay line further comprises:
   a secondary delay line having a first input programmably coupled to the reference clock node and at least one secondary delay data input coupled to the control logic circuit, a delay period of the secondary delay line controlled by the at least one secondary delay data input;
   a primary delay line having a first input programmably coupled to the output of the secondary delay line and at least one primary delay data input coupled to the control logic circuit, a delay period of the primary delay line controlled by the at least one primary delay data input; and
   a pulse shaper having an input coupled to the output of the second delay line and an output coupled to the output of the programmable delay line.

3. The delay locked loop of claim 2 wherein:
   the control circuit is configured to provide delay data to the at least one secondary delay data input only during an acquisition mode; and
   the control circuit is configured to provide delay data to the at least one primary delay data input during the acquisition mode and during a normal operating mode.

4. The delay locked loop of claim 3 further including:
   at least one primary delay data status line coupled to the at least one secondary delay data input;
   at least one secondary delay data status line coupled to the at least one primary delay data input;
   wherein the at least one secondary delay data status line and the least one primary delay data status line are programmably coupled to be read out of the FPGA.

5. The delay locked loop of claim 1 further including:
   an external clock I/O pad;
   an internal clock node; and
   wherein the reference clock node is programmably coupled to the external clock I/O pad and the internal clock node.

6. The delay locked loop of claim 1, further including an inverter programmably coupled between the data output of the flip-flop and the data input of the flip-flop.

7. The delay locked loop of claim 1, further including an inverter programmably coupled between the reference clock node and the reference clock input of the reference delay line.

8. The delay locked loop of claim 1, further including an inverter programmably coupled between the feedback node and the input of the feedback delay line.

9. The delay locked loop of claim 1, further including a clock doubler having an input programmably coupled to the external clock I/O pad, the internal clock node, and the out put of the programmable delay line, the clock doubler further having an output programmably coupled to the input of the clock tree.

10. The delay locked loop of claim 1, further including:
    a first matching delay line programmably coupled between the output of the reference delay line and the first input of the phase detector;
    programmably coupled between the output of the feedback delay line and the second input of the phase detector;
    a first divide-by-two circuit programmably coupled between the output of the reference delay line and the first input of the phase detector; and
    a second divide-by-two circuit programmably coupled between the output of the feedback delay line and the second input of the phase detector.

* * * * *